United States Patent

Corbitt, III

[11] Patent Number: 4,713,908
[45] Date of Patent: Dec. 22, 1987

[54] BAIT GUARD FOR A FISH HOOK

[76] Inventor: Newsome E. Corbitt, III, 3724 Beauclerc Rd., Jacksonville, Fla. 32217

[21] Appl. No.: 884,176

[22] Filed: Jul. 9, 1986

[51] Int. Cl.$^4$ ............................................. A01K 83/00
[52] U.S. Cl. ........................................ 43/43.4; 43/44.2
[58] Field of Search ................... 43/43.2, 43.4, 43.6, 43/44.2, 44.4, 44.8

[56] References Cited

U.S. PATENT DOCUMENTS

| | | | |
|---|---|---|---|
| 797,281 | 8/1905 | Henzel | 43/43.6 |
| 934,150 | 9/1909 | Evans | 43/43.6 |
| 2,651,134 | 9/1953 | Kemmerer | 43/43.2 |
| 3,142,928 | 8/1964 | Adams | 43/43.4 |
| 3,465,466 | 9/1969 | Showolter | 43/44.8 |
| 3,497,988 | 3/1970 | Childers | 43/43.4 |
| 3,670,446 | 6/1972 | Wheeler | 43/43.4 |
| 3,986,290 | 10/1976 | Chapman | 43/43.6 |
| 4,557,065 | 12/1985 | Rye | 43/44.8 |

FOREIGN PATENT DOCUMENTS 986185  1/1951  France ................... 43/43.6

Primary Examiner—M. Jordan
Assistant Examiner—Karen Skillman
Attorney, Agent, or Firm—Berman, Aisenberg & Platt

[57] ABSTRACT

A bait-saving fish hook has a hook portion having a barbed point connected to one end of a shank portion having an eye portion at its other end. A basket comprising a strand is secured to the eye portion at one end, and is spaced apart from one side of the shank portion and is approximately the same length as and parallel to the shank portion. The strand forms a v-shaped notch at the barbed point and is spaced apart from, approximately the same length as and parallel to the shank portion on the other side of the shank portion. The strand is secured to the eye portion at its other end. The basket attachment prevents the bait from falling off the fish hook and gives the fisherman an improved feel for the fish bite.

14 Claims, 3 Drawing Figures

BAIT GUARD FOR A FISH HOOK

FIELD OF THE INVENTION

This invention relates to bait guards for fish hooks, in particular to bait guards of the basket type.

BACKGROUND OF THE INVENTION

Fish hooks known in the art have not successfully solved the problem of bait falling off the hook. Prior art patents have used strand-type basket devices for a variety of purposes. Livermore, U.S. Pat. No. 51,951, shows a loop guard attached to the eyelet of a fish hook for engaging the hook point upwardly or downwardly in the mouth of the fish. Wentz, U.S. Pat. No. 2,608,791, and Kracht, U.S. Pat. No. 2,938,296, also show a guarded hook for engaging firmly in the mouth of the fish. Showalter, U.S. Pat. No. 3,465,466, shows a weed-deflecting guard which closes the gap between eyelet and hook. Flowers, U.S. Pat. No. 4,229,001, shows a fish hook with an encircling holder into which live bait is inserted.

SUMMARY OF THE INVENTION

A bait guard for a fish hook having a barbed hook portion connected to one end of a shank portion and an eye portion at its other end, has a wire basket secured to the eye portion of the fish hook at one end and, preferably, two strands approximately parallel to each other and to the shank portion spaced away from each side of the shank portion. The two strands are disposed on either side of the shank portion, and are joined in a v-shaped notch at the barbed point.

It is an object of the invention to provide a bait guard for a fish hook which provides a means for retaining the bait on the hook.

It is another object of the invention to provide a bait guard for a fish hook in the form of a wire basket secured to the fish hook.

It is a further object of the invention to provide a fish hook with a bait guard which gives the fisherman an improved feel for the fish bite.

DETAILED DESCRIPTION OF THE INVENTION

In a preferred embodiment, the bait-saving fish hook of the invention has a flexible two-strand wire basket bait guard attached to it. One end of the basket is wrapped around the eye of the fish hook and the other end is engaged on to the tip of the barbed point at a v-shaped notch. The wire basket helps to keep bait from falling off the hook, and makes it harder for fish to steal the bait, as well as helping the fisherman to feel the bite of the fish. The bait-saving fish hook of the invention helps the fisherman to catch more fish because it is harder for the fish to get the bait off the hook. Thus, the fish bites harder at the bait and the fisherman feels the bite more easily.

Figure 1:
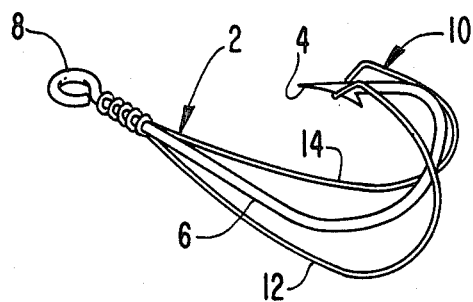
FIG. 1 is a perspective view of a fish hook having a basket engaged on the barbed point.
Figure 2:
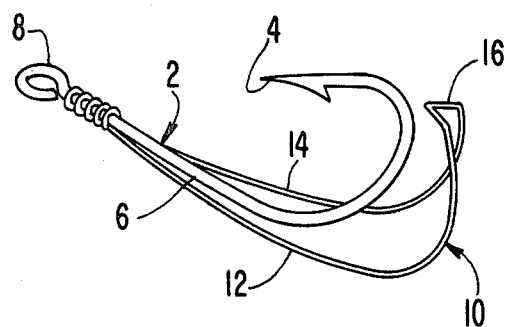
FIG. 2 is a perspective view of a fish hook having the basket disengaged from the barbed point.
Figure 3:
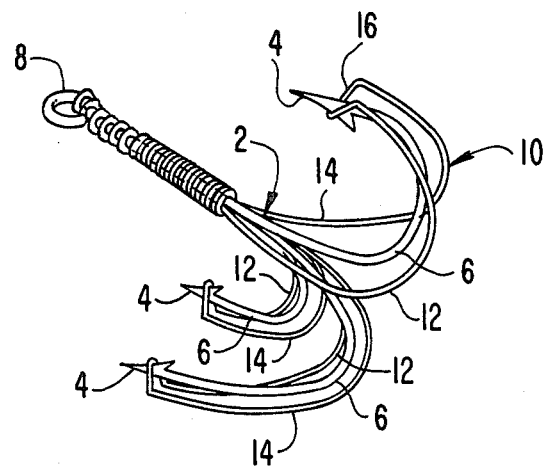
FIG. 3 shows another embodiment of a fish hook having the basket wrapped adjacent to the eyelet portion of the hook.

Referring now to FIGS. 1-3 in which like numerals represent like parts, fish hook 2 has a barbed point 4 connected to a shank portion 6. At the other end of shank portion 6 is eye portion 8, shown as a closed eyelet. Basket 10, which is preferably of wire, comprises a strand 12 secured to the eye portion 8 at one end, spaced apart from one side of the shank portion 6 and approximately the same length as and parallel to shank portion 6, strand 12 forming a v-shaped notch 16 engaging barbed point 4. The strand continues, spaced apart from the other side of shank portion 6, as strand 14 which extends from the v-shaped notch 16 to the eyelet portion 8 in a similar manner to strand 12, approximately the same length as and parallel to, shank portion 6.

In use, the wire basket is removed from the barbed point, as shown in FIG. 2, the bait is fastened to the barbed point 4 and the v-shaped notch 16 of the basket 10 is hooked onto barbed point 4. The hook is cast into the water in the usual manner. The strands of the basket are elongated flexible members, and may be strands of wire, plastic coated wire, plastic or other appropriate material or may be flat-surfaced, elongated flexible members, or may be any elongated flexible members suitable for the purpose.

The bait guard may also be a single strand bait guard, attached to the eye portion of the fishook at one end and engaged on the barbed point at the other end, spaced apart from one side of the shank portion of the fishook. Other variations include double wires and different engagement means on the barbed point, such as a loop or twist. The eye portion may be an open eye or a closed eye. The basket may alternatively only have one strand which engages the eye portion at one end and the barbed point at the other end.

The basket is attached to the eye portion by any convenient method such as by winding the strands through the eye or around a portion of the hook adjacent the eye. The wire may also be wrapped on the eye portion of the fish hook, as shown in FIG. 3, by means of thread 18 which may be wire, plastic, linen or other appropriate material. Each strand may also be soldered, secured adhesively to the fish hook, or fastened by other equivalent means. The fish hook used may be of the traditional variety, may have a bent shank portion or any other variation as is known in the art.

While, the bait guard of the invention has been described and illustrated on a single hook, is equally applicable to the provision of a basket on at least one hook of a double or treble fish hook. Further, the bait guard of the invention may be used on a hook together with a skirt, weedguard, or other device commonly found in association with fish hooks.

While the invention has been described above with respect to certain embodiments thereof, it will be appreciated that various changes and modifications may be made without departing from the spirit and scope of the invention.

What is claimed is:

1. A bait guard for use with a fish hook, said fish hook having a rearward eye portion, a shank portion, and a forward hook portion, said bait guard comprising:
   means for guarding bait, said means being attached to the eye portion, comprising:
   an elongated flexible member secured to the eye portion, extending forwardly along at least one side of the shank portion, following the curve of the hook portion and extending rearwardly to and in engagement with a barb on the end of the hook portion.

2. A bait guard of claim 1 wherein the flexible member engages the barb in a notch in the member.

3. A bait guard of claim 1 wherein the flexible member is a wire strand.

4. A bait guard of claim 1 wherein the flexible member is a plastic-covered wire strand.

5. A bait guard of claim 1 wherein the flexible member is a plastic strand.

6. A bait guard of claim 1 wherein the flexible member is adhesively secured to the eye portion.

7. A bait guard of claim 1 wherein the flexible member is soldered to the eye portion.

8. A bait guard of claim 1 wherein the flexible member is secured to the eye portion by wrapping.

9. A bait guard of claim 8 wherein the flexible member is secured to the eye portion by wrapping with thread.

10. A bait guard of claim 9 wherein the thread is plastic thread.

11. A bait guard of claim 1 wherein said means for guarding bait comprises a basket.

12. A bait guard of claim 1 wherein said fish hook comprises a multiple hook portion and said means for guarding bait comprises a multiple basket.

13. A bait guard of claim 2 wherein the notch joints ends of spaced apart flexible members which are spaced apart from the shank portion on each side of the shank portion, one end of each flexible member engaging the eye portion.

14. A bait guard for use with a fish hook, said fish hook having an eye portion, a shank portion, and a hook portion, said bait guard comprising:
at least one elongated flexible member secured to the eye portion, extending forwardly along one side of the shank portion, following the curve of the hook portion and extending rearwardly to and in engagement with a barb on the end of the hook portion, and then following the other side of the fishhook along the curve of the hook, rearwardly along the shank, and into securement with the eye portion.

* * * * *